(12) United States Patent
Hunter

(10) Patent No.: US 8,936,456 B2
(45) Date of Patent: Jan. 20, 2015

(54) PROCESS AND APPARATUS FOR MOLDING A FILTER

(75) Inventor: David Matthew Hunter, Stockton-on-Tees (GB)

(73) Assignee: PSI Global Ltd. (GB)

( * ) Notice: Subject to any disclaimer, the term of this patent is extended or adjusted under 35 U.S.C. 154(b) by 446 days.

(21) Appl. No.: 13/384,472

(22) PCT Filed: Jul. 23, 2010

(86) PCT No.: PCT/GB2010/051223
§ 371 (c)(1),
(2), (4) Date: Jul. 2, 2012

(87) PCT Pub. No.: WO2011/010165
PCT Pub. Date: Jan. 27, 2011

(65) Prior Publication Data
US 2012/0267816 A1 Oct. 25, 2012

(30) Foreign Application Priority Data

Jul. 24, 2009 (GB) .................................. 0912880.2

(51) Int. Cl.
*B29C 41/16* (2006.01)
*B01D 46/00* (2006.01)
(Continued)

(52) U.S. Cl.
CPC .......... *B01D 46/0001* (2013.01); *B01D 46/003* (2013.01); *B01D 46/2403* (2013.01);
(Continued)

(58) Field of Classification Search
CPC ...................................................... B29C 41/16
USPC ............................................................. 425/85
See application file for complete search history.

(56) References Cited

U.S. PATENT DOCUMENTS

| 4,082,893 | A | 4/1978 | Okita |
| 4,225,547 | A | 9/1980 | Okita |

(Continued)

FOREIGN PATENT DOCUMENTS

| EP | 1077756 B1 | 7/2003 |
| EP | 1385598 B1 | 8/2010 |

(Continued)

OTHER PUBLICATIONS

"International Application Serial No. PCT/GB2010/051223, International Preliminary Report on Patentability dated Jan. 24, 2012", 7 pgs.
(Continued)

*Primary Examiner* — Yogendra Gupta
*Assistant Examiner* — Alison Hindenlang
(74) *Attorney, Agent, or Firm* — Schwegman Lundberg & Woessner, P.A.

(57) ABSTRACT

The invention provides a method for forming a fibrous layer within a tubular support, which comprises the steps of: (a) providing the tubular support; (b) providing forming mesh over the curved surface of the support and closing its ends against escape of fluid; and (c) introducing fibrous slurry (e.g. an aqueous slurry of borosilicate glass microfibers and water dispersible heat curable acrylic resin at a pH of about 3) from a pressurized source into an annular molding space between a rotary molding torpedo and an inner surface of the support, the torpedo having at least one channel for slurry opening along a curved surface thereof, fibers in the slurry collecting within the forming mesh to form the layer. The invention also provides apparatus for forming a fibrous layer within a tubular support, which comprises: (a) a mold having a molding space for the tubular support; (b) forming mesh in the molding space for covering an exterior curved surface of the support, the forming mesh being configured to collect fibers and permit liquid to pass through it; (c) headstock and tailstock end closures for closing headstock and tailstock ends of the support against escape of fluid; (d) a rotary molding torpedo extendible into and retractable from the molding space for defining with an internal curved surface of the support an annular space for formation of the fibrous layer, the torpedo having at least one channel for slurry opening along a curved surface thereof; (e) a drive coupled to the torpedo for rotation thereof during molding; and (f) a supply line for supplying fibrous slurry from a pressurized source to the torpedo for flow into and through the molding space; and (g) suction means for withdrawing fluid from the molding space.

20 Claims, 9 Drawing Sheets

(51) Int. Cl.
*B01D 46/24* (2006.01)
*B29C 33/30* (2006.01)
*B29C 41/00* (2006.01)
*B29L 31/14* (2006.01)

(52) U.S. Cl.
CPC ............ *B29C 33/302* (2013.01); *B29C 41/003* (2013.01); *B29C 41/16* (2013.01); *B29L 2031/14* (2013.01)
USPC .......................................................... 425/85

(56) References Cited

U.S. PATENT DOCUMENTS

| | | | |
|---|---|---|---|
| 4,234,535 | A | 11/1980 | Okita |
| 4,303,472 | A | 12/1981 | Walker et al. |
| 4,376,675 | A | 3/1983 | Perrotta |
| 5,129,923 | A | 7/1992 | Hunter et al. |
| 5,318,990 | A | 6/1994 | Strauss |
| 5,932,689 | A | 8/1999 | Arkens et al. |
| 5,977,232 | A | 11/1999 | Arkens et al. |
| 6,071,994 | A | 6/2000 | Hummerich et al. |
| 6,099,773 | A | 8/2000 | Reck et al. |
| 6,136,916 | A | 10/2000 | Arkens et al. |
| 6,146,746 | A | 11/2000 | Reck et al. |
| 6,221,973 | B1 | 4/2001 | Arkens et al. |
| 6,274,661 | B1 | 8/2001 | Chen et al. |
| 6,299,936 | B1 | 10/2001 | Reck et al. |
| 6,331,350 | B1 | 12/2001 | Taylor et al. |
| 6,699,945 | B1 | 3/2004 | Chen et al. |
| 2002/0119299 | A1 | 8/2002 | Chen |

FOREIGN PATENT DOCUMENTS

| | | |
|---|---|---|
| GB | 1573196 A | 8/1980 |
| WO | WO-89/07484 A1 | 8/1989 |
| WO | WO-2008/125885 A1 | 10/2008 |

OTHER PUBLICATIONS

"International Application Serial No. PCT/GB2010/051223, Written Opinion mailed Sep. 24, 2010", 6 pgs.

"Great Britain Application Serial No. GB0912880.2, Search Report mailed Dec. 15, 2009", 3 pgs.

"International Application Serial No. PCT/GB2010/051223, International Search Report mailed Sep. 24, 2010", 2 pgs.

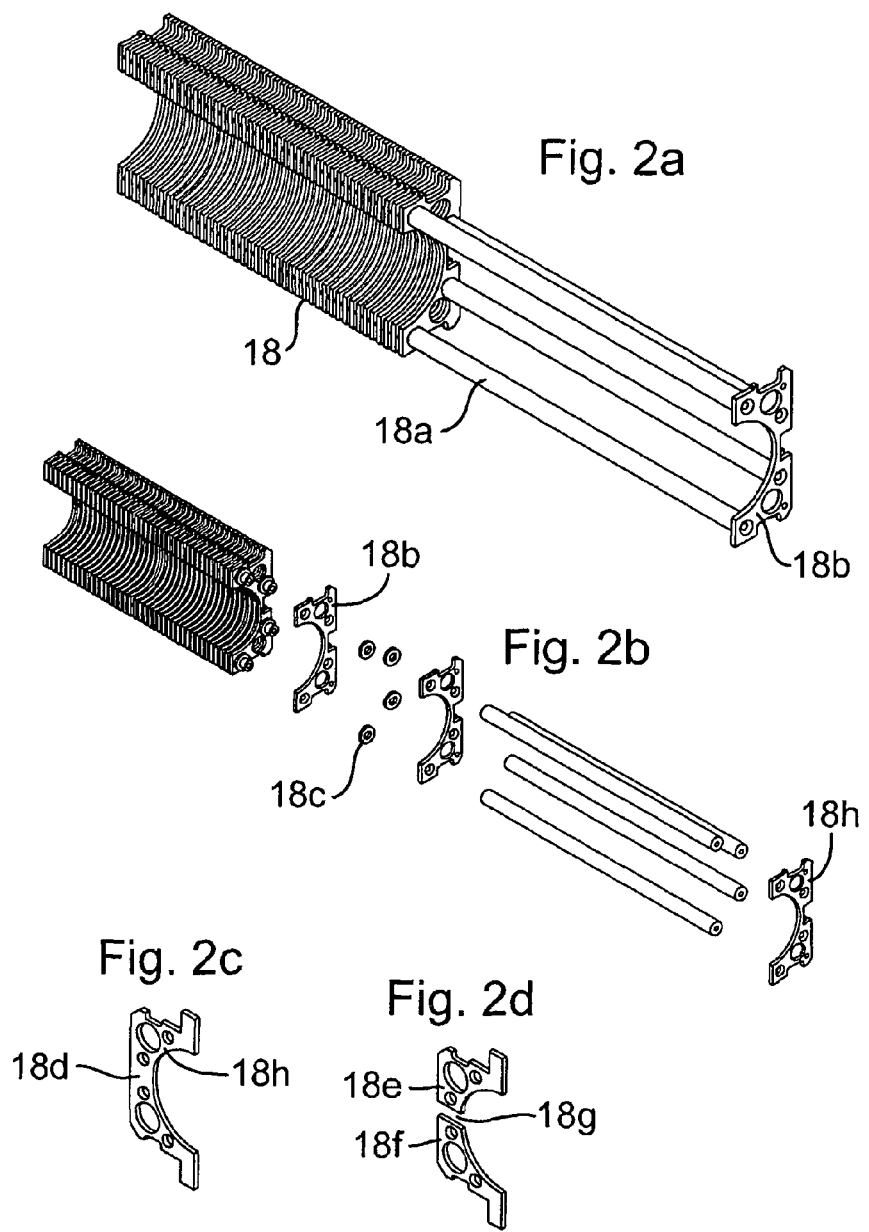

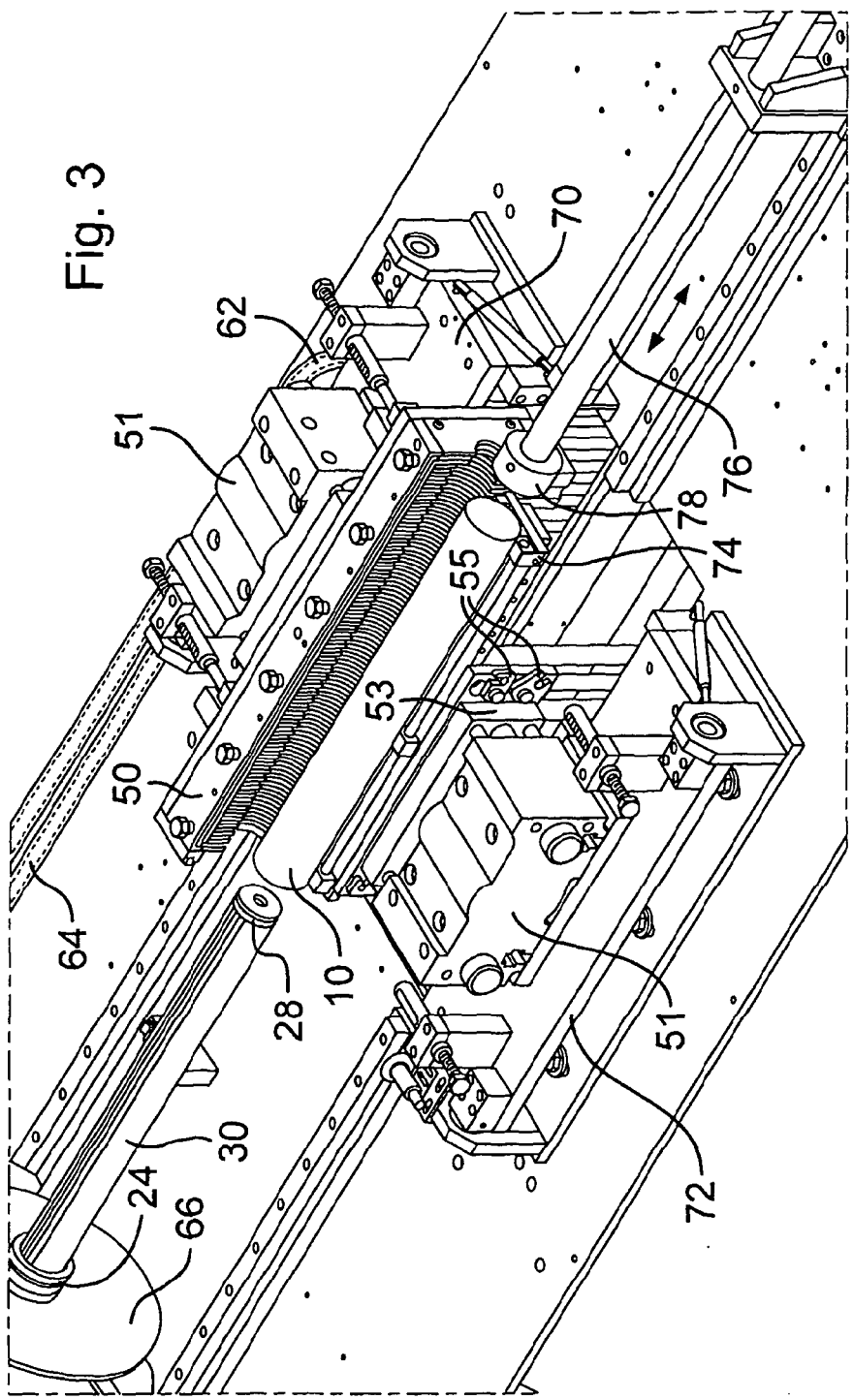

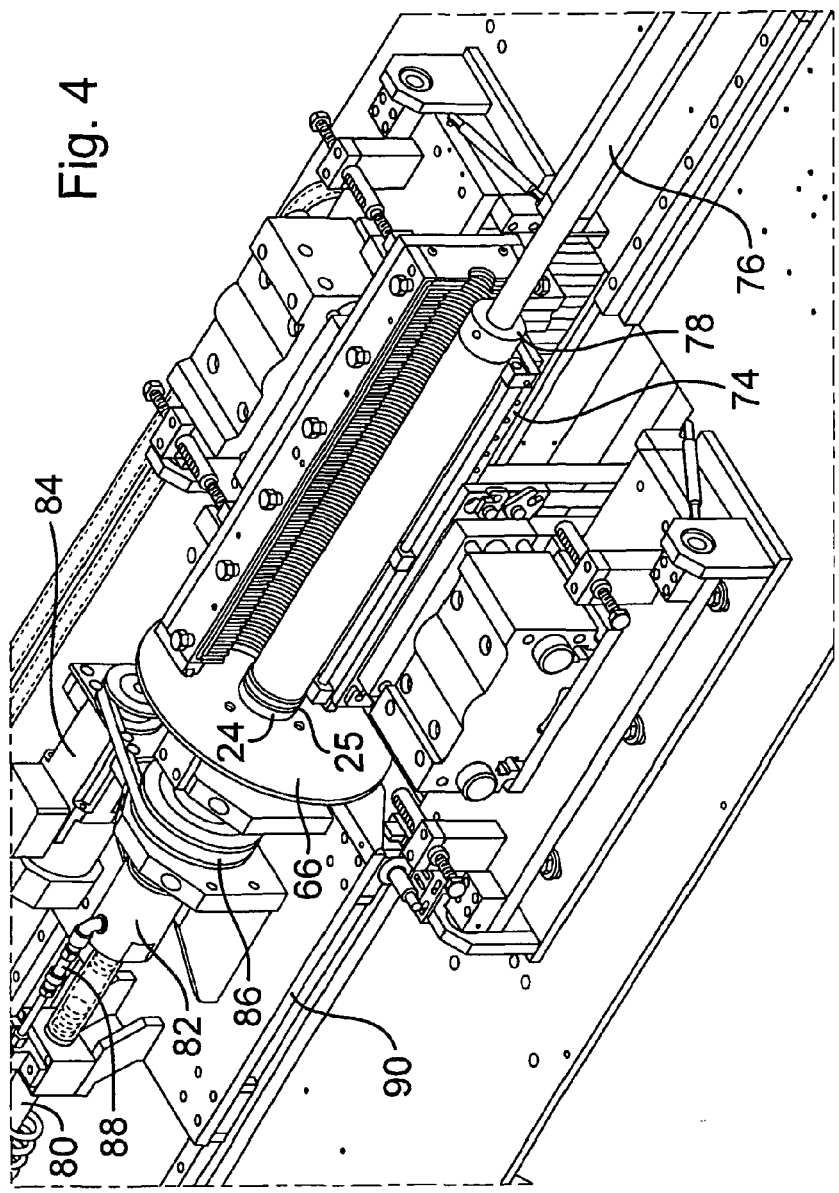

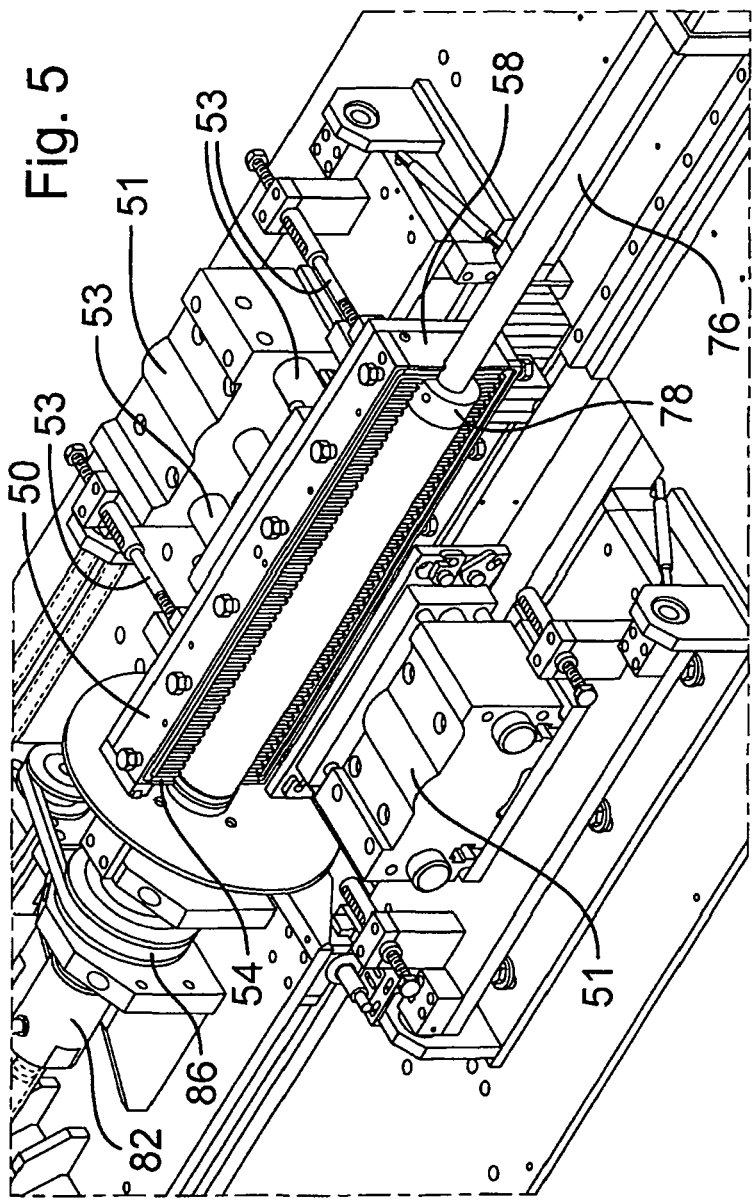

PROCESS AND APPARATUS FOR MOLDING A FILTER

RELATED APPLICATIONS

This application is a nationalization under 35 U.S.C. 371 of PCT/GB2010/051223, filed Jul. 23, 2010 and published as WO 2011/010165 A1 on Jan. 27, 2011, which claimed priority under 35 U.S.C. 119 to United Kingdom Patent Application Serial No. 0912880.2, filed Jul. 24, 2009; which applications and publication are incorporated herein by reference in their entirety.

FIELD OF THE INVENTION

This invention which claims priority from UK patent application 09/12880.2 filed 24 Jul. 2009 (the disclosure of which is incorporated herein by reference) relates to a process and apparatus for molding a fibrous filter layer e.g. a coalescing layer of a micro-fibrous filter. A coalescing filter may in some embodiments be used for the removal of oil droplets from an airstream, for example but not limited to an airstream from an oil-lubricated compressor or vacuum pump or in an air line.

BACKGROUND TO THE INVENTION

Tubular coalescing filters e.g. for removal of oil from the output of an oil-lubricated compressor are known. In embodiments they have a tubular support e.g. of foraminous metal having on an inner face a fibrous coalescing layer and on the outer face a drainage layer. In other embodiments the coalescing layer is between inner and outer foraminous supports. Coalescing filters of the above construction are described e.g. in e.g. WO 89/07484, EP-B-0177756 and WO 2008/125885, the disclosures of which are incorporated herein by reference.

U.S. Pat. No. 4,303,472 (the disclosure of which is incorporated herein by reference) describes and claims a method for forming a tubular filter element which may find utility for the above purpose and which includes the steps of:

(a) forming a slurry of fibers in a liquid;
(b) introducing the slurry under pressure into the top of an annular molding space defined between a central core, a vertical cylindrical screen spaced from and outward of said core and a support defining a lower boundary for the molding space so that a mass of fibers becomes compacted on the screen and liquid is discharged from the molding space through the screen;
(c) progressively increasing the height of the effective open area of the cylindrical screen by moving upwardly a sleeve in sliding contact with the cylindrical screen at a rate substantially equal to the rate at which the height of the mass of fibers increases above the support; and
(d) removing the resulting tubular mass of fibers from the molding space.

In a practical embodiment, the filter element comprises a mass of borosilicate glass micro fibres bounded by a foraminous outer support sheet or by foraminous inner and outer support sheets, e.g. of steel mesh with an open area of 45-70%. The borosilicate fibers are dispersed in water in a blending tank under mechanical agitation, and an acid, e.g. hydrochloric or sulfuric acid is added to give a pH of 2.9-3.1 at which the dispersion is stable, the fiber to water ratio being 0.01-0.5 wt %, typically 0.05 wt %. The resulting slurry is introduced into the molding space under a pressure of typically 290-480 Pa (6-10 p.s.i) and molded as described above. The sleeve is raised progressively at substantially the same rate as that at which the height of the fiber mass increases in order to maintain a flow of the dispersion to the point where the mass of fibers is building up, after which air may be passed through the molded element to reduce the content of residual water. The formed filter element is removed from the molding space, oven dried, resin impregnated and heated to harden the resin. As originally disclosed, the resin could be e.g. a silicone or an epoxy resin and could be impregnated in a solvent such as acetone, but it is now preferred that the resin should be a phenolic resin which may be impregnated as an aqueous solution. The fibers in a finished filter element produced by the above method are predominantly layered in planes perpendicular to the direction in which the dispersion flows into the molding space, and the same packing pattern arises throughout the range of forming pressures that can be used in practice. This non-random packing pattern results in a filter element that provides efficient depth filtration and has an advantageous combination of properties including high burst strength and low pressure drop. The molded tubular elements may be bonded to end caps to complete the formation of the filter and a drainage layer may be added.

The above process has been used e.g. to manufacture air/oil separators designed to remove water and oil mist particles generated in screw or sliding vane compressors or in vacuum pumps where the size of the particles generated lies in the range 0.3-1.5 microns (μm) and also to manufacture in-line filters for removing oil, water and contaminants from a stream of compressed air. Filters for the above purposes are described in our U.S. Pat. No. 5,129,923 the disclosure of which is also incorporated herein by reference.

SUMMARY OF THE INVENTION

It is an object of the invention to provide an alternative molding apparatus and process for molding filter layers within tubular supports, which process and apparatus in some embodiments can provide improved consistency of molding, and greater uniformity of the formed layer axially of the support and greater predictability in filter performance by greater control of the weight of media in a given filter element.

In one aspect the invention provides a method for forming a fibrous layer within a tubular support, which comprises the steps of:

(a) providing the tubular support;
(b) providing forming mesh over the curved surface of the support and closing its ends against escape of fluid; and
(c) introducing fibrous slurry from a pressurized source into an annular molding space between a rotary molding torpedo and an inner surface of the support, the torpedo having at least one channel for slurry opening along a curved surface thereof, fibers in the slurry collecting within the forming mesh to form the layer.

In another aspect, the invention provides apparatus for forming a fibrous layer within a tubular support, which comprises:

(a) a mould having a molding space for the tubular support;
(b) forming mesh in the molding space for covering an exterior curved surface of the support, the forming mesh being configured to collect fibers and permit liquid to pass through it;
(c) headstock and tailstock end closures for closing headstock and tailstock ends of the support against escape of fluid;
(d) a rotary molding torpedo extendible into and retractable from the molding space for defining with an internal curved surface of the support an annular space for formation of the fibrous layer, the torpedo having at least one channel for slurry opening along a curved surface thereof;

(e) a drive coupled to the torpedo for rotation thereof during molding;

(f) a supply line for supplying fibrous slurry from a pressurized source to the torpedo for flow into and through the molding space;

(g) suction means for withdrawing fluid from the molding space.

Filters made using the above described process or apparatus may be employed for a wide range of applications including gas filtration e.g. for oil mist coalescence, building air-conditioning and filtration of air for clean rooms.

BRIEF DESCRIPTION OF THE DRAWINGS

How the invention may be put into effect will now be described by way of example only with reference to the accompanying drawings, in which:

FIG. 1a is an isometric view on an enlarged scale of a tailstock end of a torpedo forming part of the molding rig of FIG. 1;

FIG. 2a is an isometric view of a support forming part of the half-mould of FIG. 2 with some of its plates removed to reveal support rods, FIG. 2b is an isometric view like FIG. 2a but with the support shown partly exploded, and FIGS. 2c and 2d are isometric views of individual plates;

FIGS. 3-6 are isometric views of portions of a molding rig in successive states of a molding process;

DETAILED DESCRIPTION OF PREFERRED EMBODIMENTS

Figure 1:
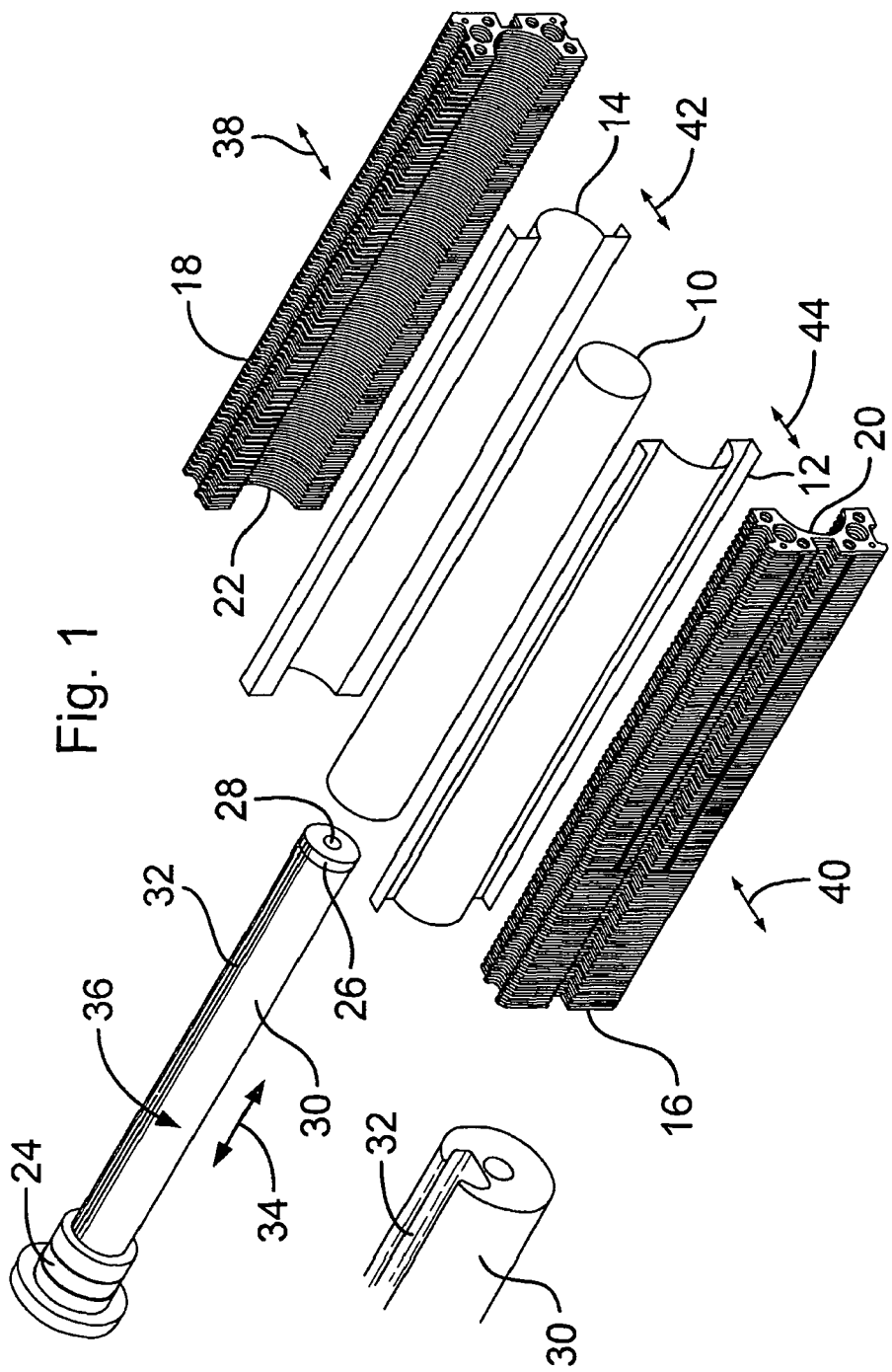
FIG. 1 is an exploded isometric view showing a foraminous support sheet, forming wires and other components of a molding rig for use in an embodiment of the molding process.

The invention is concerned with the manufacture of filter media from cylindrical support sheets and water-dispersible microfibers.

Support Sheets

The support sheet(s) 10 are tubular and may be e.g. of steel mesh with an open area of 45-70%, or may be of other metal or plastics.

Microfibers and Dispersions

The microfibers may be e.g. inorganic fibers, in some embodiments glass microfibers and especially borosilicate glass microfibers. However, the fibers that can be molded are not limited to borosilicate glass microfibers, and include other water dispersible filter-forming fibers including polyester fibers, polyamide fibers, and other synthetic fibers and mixtures of borosilicate or other glass fibers with synthetic fibers. The dispersion may comprise water and microfibers or it may additionally comprise a resin.

The microfibers are molded from aqueous dispersion. Stability of fiber dispersions in aqueous dispersion media can be pH dependent. Accurate control of the pH of the dispersion is desirable e.g. in the case of borosilicate fiber dispersions which are unstable and flocculate outside a narrow pH range and are also susceptible to damage by acid. For borosilicate microfibers we have found that the pH is desirably maintained at 2.9-3.0±0.1, otherwise the fibers form clumps which make molding more difficult and reduce the performance of the resulting filter. In embodiments, the fiber to water ratio is 0.01-0.5 wt %, e.g. 0.1 wt % (10 g/l).

Our EP-A-1385598 (the disclosure of which is incorporated herein by reference) discloses that improved consistency in molding fibrous filter elements from slurry can be achieved by providing a slurry holding tank or tanks separate from a slurry mixing tank or tanks, recycling aqueous liquid from the or each molding rig to a reservoir also fed with mains water, and controlling the total volume of water in the apparatus so that mains water need be added to the reservoir only in relatively small increments compared to the volume of aqueous liquid already in the reservoir which then contains predominantly recycled aqueous liquid of known composition or contains liquid of gradually changing composition. By having liquid in the reservoir tank whose composition is largely known or gradually changing, abrupt changes in composition of the liquid in the mixing tank or tanks is avoided and instability and over-shoot in systems for controlling the composition of liquid in the mixing tank or tanks can be avoided. Furthermore mixing can be continued until it has been determined that a freshly made slurry mix is of the correct consistency and free of fiber aggregates before the slurry is allowed to enter the holding tank or tanks and to be supplied to the molding rig or rigs.

In the process of EP-A-0138598, control may be achieved by providing a pH sensor for immersion in the aqueous slurry and a pH control circuit for monitoring the pH of the aqueous liquid in said mixing tank on the basis of received signals from said pH sensor, the circuit being configured such that when said pH is outside a range of target values the control circuit operates an acid or base supply control valve to add acid or base to the molding tank to adjust the pH of the aqueous liquid therein. Further control of the consistency of the slurry may be achieved by providing a turbidity sensor for monitoring the consistency and aggregation of the fiber slurry, the microfibers being mixed to a constant turbidity before the resulting slurry is introduced into the molding space. Real-time optical sensing of the consistency of the mix is desirable for an operator to be certain that mixing has been completed and that the mix does not contain fiber aggregates.

The pH required for stable microfiber dispersion may be significant for the timing of resin addition since phenolic resins, for example, polymerize in acid and cannot be added to a dispersion at pH 2.9 or the like. A molded filter can only be treated with phenolic resin after the molding operation has taken place. However, water-soluble thermosetting acrylic acid-based resin binders can be incorporated into aqueous dispersions of heat resistant inorganic fibers e.g. borosilicate glass micro-fibers and the dispersions can be used to mould filter elements, after which the molded filter elements can be dried and heat-cured. Unlike phenol-formaldehyde binders, the acrylic resins provide acid-tolerant binders that can be incorporated into the filter as-molded without post-molding drying and impregnation steps, and can be cured following the molding process to give a filter having similar physical properties and performance e.g. in oil coalescing to a phenol-formaldehyde bound filter but of improved appearance.

Acid-Tolerant Resin Binders

Resins that can be used in the present method and incorporated into the microfiber dispersion used in the molding process include phenol-free binders which are thermosetting acrylic acid-based resin binders which cure by crosslinking with a polyfunctional alcohol or other polyfunctional carboxyl-group reactive curing agent. U.S. Pat. No. 6,071,994 (Hummerich, assigned to BASF) (the disclosure of which is incorporated herein by reference) discloses formaldehyde-free aqueous binder compositions which can be used as binders in the present filters.

One preferred resin that may be used in the method of the invention is Acrodur DS 3530 (BASF) which is an aqueous solution of a modified polycarboxylic acid and a polyhydric alcohol as crosslinking component and as supplied has a solids content of 50 wt %, a pH of 2.5-4, a molecular weight of about 12,000 and a Brookfield viscosity at 23° C. of 150-300 mPa·s. A further more preferred resin is Acrodur 950 L (BASF) which is similar, but has a pH of 3.5, a molecular weight of about 80,000 and a Brookfield viscosity at 23° C. of 600-4000 mPa·s. It has been stated to crosslink at temperatures as low as 180° C., with a recommended temperature of 200° C. and is an aqueous solution of a substituted polycarboxylic acid. It contains a polybasic alcohol as the crosslinking agent. The polycarboxylic acid is a carboxylated acrylic polymer and the polybasic alcohol is triethanolamine. The preparation is presented as a 50% solids solution in water with viscosity of 1000-4500 cps and specific gravity of 1.2. It may be used in the dispersion at e.g. a concentration of about 40-80 g/liter depending on the desired mechanical properties of the filter, the effect of resin concentration in the dispersion on pressure drop of the resulting filter medium being relatively small. Waste aqueous liquid from the molding process may be recycled to the dispersion-forming tank giving economy of resin use. Cure temperatures of Acrodur resins are typically 130° C. and 200° C.

A further group of resins that may be used in the filter and method of this invention is described in U.S. Pat. No. 5,318,990 (Strauss et al., Owens-Corning), the disclosure of which is incorporated herein by reference, which are based on an aqueous solution of a polycarboxy polymer, a monomeric trihydric alcohol and a catalyst. The resins are disclosed as binders for glass fibers that have a low viscosity when uncured and structural rigidity when cured. U.S. Pat. No. 5,932,689 (Arkens et al., Rohm & Haas) (the disclosure of which is incorporated herein by reference) discloses formaldehyde-free compositions which can be used as binders in the present filters, but which do not essentially require the presence of an accelerator and can be crosslinked at relatively low temperatures. Other references that disclose suitable formaldehyde-free binder resins and whose disclosures are incorporated herein by reference include U.S. Pat. No. 5,977,232 (Arkens), U.S. Pat. No. 6,136,916 (Arkens), U.S. Pat. No. 6,274,661 (Chen, assigned to Owens Corning Fiberglass), U.S. Pat. No. 6,331,350 (Taylor, Johns Manville), U.S. Pat. No. 6,699,945 (Chen, Owens Corning). Further disclosures of suitable resins are in U.S. Pat. No. 6,146,746 (Reck, assigned to BASF) and in U.S. Pat. No. 6,099,773 and U.S. Pat. No. 6,299,936, the disclosure of which is also incorporated herein by reference.

U.S. Pat. No. 6,221,973 (Arkens) (the disclosure of which is incorporated herein by reference) discloses compositions which can be used as binders in the filter and method of this invention based on (a) a polyacid containing at least two carboxylic acid groups, anhydride groups or salts thereof, and (b) a polyol containing at least two hydroxyl groups which in one embodiment contain a highly reactive polyol without a phosphorous-containing accelerator. Polyols sufficiently reactive to permit the omission of a phosphorous-containing accelerator may be used in the composition which contains (a) a polyacid containing at least two carboxylic acid groups, anhydride groups, or the salts thereof and (b) a highly reactive polyol containing at least two hydroxyl groups; wherein the ratio of the number of equivalents of said carboxylic acid groups, anhydride groups, or salts thereof to the number of equivalents of said hydroxyl groups is from about 1/0.01 to about 1/3, and wherein the carboxyl groups, anhydride groups, or salts thereof are neutralized to an extent of less than about 30% with a fixed base. The composition may be used as a binder for nonwovens composed of fiberglass or other heat-resistant fibers. Suitable highly reactive polyols include β-hydroxyalkyl amides e.g. bis[N,N-di(.beta.-hydroxyethyl)]adipamide, bis[N,N-di(.beta.-hydroxypropyl)]azelamide, bis[N—N-di(.beta.-hydroxypropyl)]adipamide, bis[N—N-di(.beta.-hydroxypropyl)]glutaramide, bis[N—N-di(.beta.-hydroxypropyl)]succinamide, and bis[N-methyl-N-(.beta.-hydroxyethyl)]oxamide.

A molded filter tube may be made using the process described below with borosilicate glass fibers dispersed at in water adjusted to pH 2.9-3.1 with added sulfuric acid and containing about 80 g/l Arcodur 950 L. In other embodiments the concentration of Acrodur or other water dispersible heat curable resin may be in the range 40-150 g/l and may be in the range of more than 80 g/l to 150 g/l. The fiber suspension in the acid/resin has similar molding characteristics to fiber/acid dispersion and is moldable. The molded filter tube is heated at 200° C. for 90 minutes to drive off water and cure the resin. The resulting filter tube is formed into a finished coalescing filter which may be evaluated against a similar filter tube molded a under similar conditions using phenolic/post treatment which can provide a control. The oil-wetted pressure drop and the cold start pressure drop of the acrylate-molded filter is comparable to a control using the phenolic resin and the oil carryover of the acrylate-molded filter when challenged with an oil aerosol is comparable to the control filter using phenolic resin.

Molding Apparatus and Process

Figure 2:
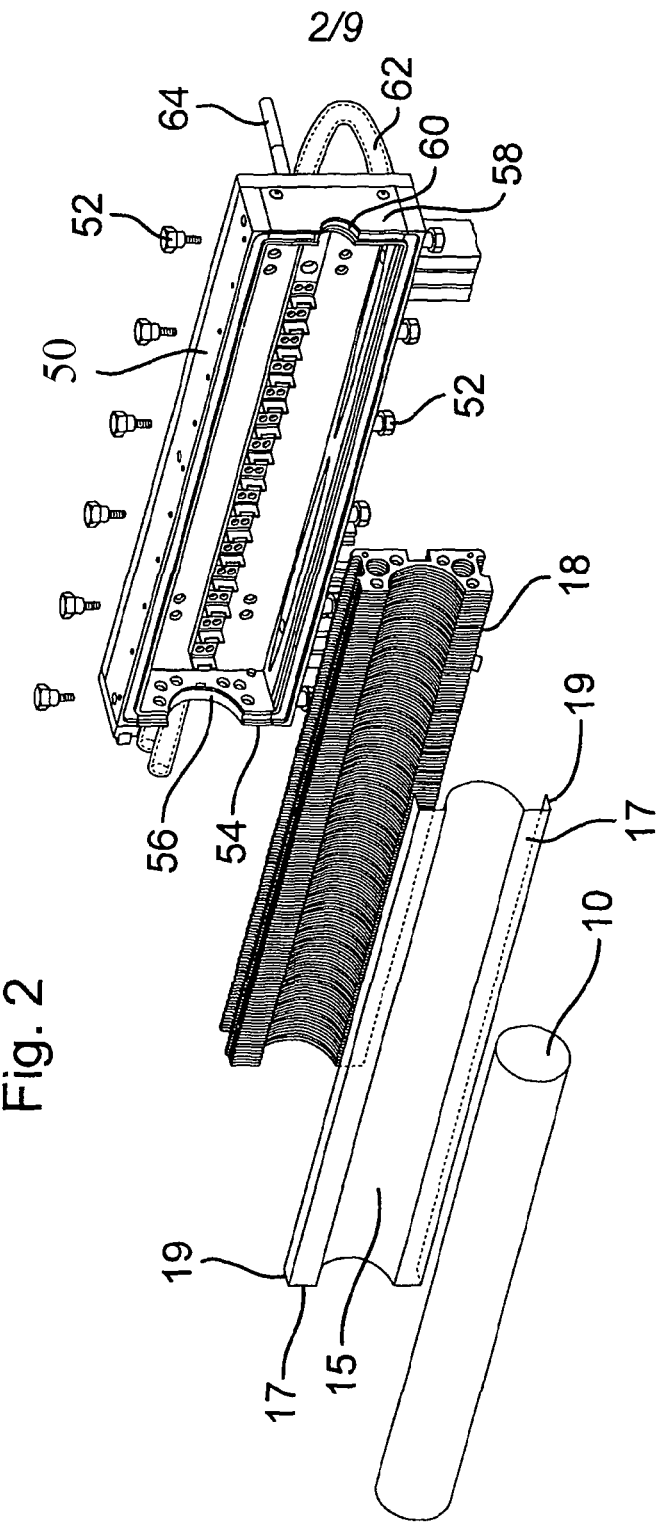
FIG. 2 is an exploded isometric view showing the forming tube and one half of the mould.
Figure 6:
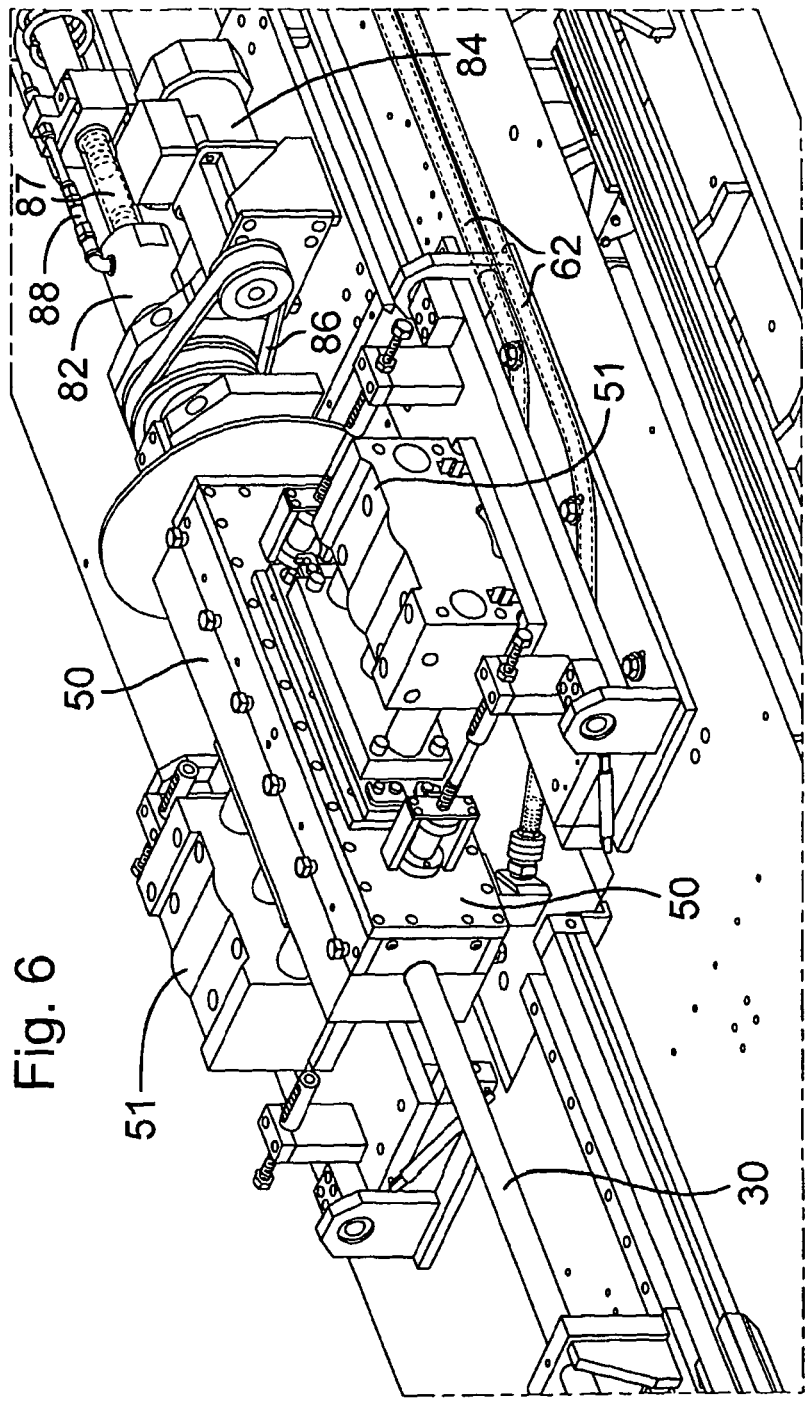

In FIGS. 1 and 2, a foraminous tubular metal cylinder or support 10 can fit within a pair of mold halves that divide longitudinally of the support in a radial plane and are movable radially towards and away from the support as indicated by arrows 38, 40.

Each mold half (FIGS. 2 and 3) comprises a molding half-box 50 having headstock and tailstock end walls 54, 58 formed with semi-circular cut outs 56, 60. Each mold half box supports a half-screen 12, 14 of stainless steel mesh (forming mesh"), 14 which is movable with the mould half box by which it is supported radially towards and away from support 10 as indicated by arrows 42, 44. Each half-screen is formed from a sheet of mesh of porosity such that liquid and gas pass through it but microfibers are retained and as best seen in FIG. 2 has a semi-cylindrical molding surface 15 bounded by radial flanges 17 terminating in return flanges 19. Each half-screen 12, 14 fits onto and is supported by a respective fluid-permeable support 16, 18 which comprises a multiplicity of plates each directed radially, spaced a short distance longitudinally apart from its adjacent plate or plates in a closely spaced array and configured so as to receive half-screen 12 or 14, the plates being formed so as together to define semi-cylindrical support surfaces 20, 22 for the concave molding surfaces of the half-screens. The half-screens 12, 14 and supports 16, 18 are held within respective mold half boxes 50 by means of bolts 52 or other fasteners. As seen in FIGS. 2a and 2b the supports 16 18 comprise stainless steel plates 18b that are apertured at 18h for passage therethrough of support bars 18a, the support bars also carrying separator washers 18c for maintaining the plates in closely spaced relationship. Most plates are formed as a single piece as exemplified by plate 18h in FIG. 2c, but some plates are divided into upper and lower halves 18e and 18f (FIG. 2d) between which is defined a passage 18g for an ejector pin operable to eject the support 10 from the half-screen when the moulding cycle is complete. Suction chambers within the mould half boxes which together define a suction box are defined by the inner surfaces of the mould half boxes, the spaced plates of the supports 16, 18 and the forming wires 12, 14. Suction pipes 62, 64 for aqueous liquid and for air lead from the suction chambers to a fluid recovery tank and/or to waste and form part of section means for withdrawing fluid from the molding space.

The molded filter is to have an in-to-out flow pattern. During the molding process a microfibrous coalescing or other filtration layer becomes formed within the support 10 by means of a rotary molding torpedo having a generally cylindrical body 30 of lesser diameter than the internal diameter of the support 10 and that can be moved into and withdrawn from the support 10 as indicated by arrows 34. During the molding process, the coalescing layer forms in an annular space defined between the body 30 and the support 10. A longitudinal channel 32 for aqueous microfiber dispersion extends the length of the body 30 and is formed with a mouth also extending the length of the body and opening through its cylindrical surface. As best seen in FIG. 1*a*, the channel 32 is wider at its base than at its mouth so that microfiber dispersion can flow freely along it and differences in the rate of outflow of the microdispersion through the mouth during the molding process as between the headstock end where the dispersion is introduced and the tailstock end are minimized. To further reduce differences in outflow of dispersion and hence differences in the molded coalescing layer longitudinally of the filter, the tubular support 10 and the molding torpedo are directed horizontally rather than vertically. In the process of U.S. Pat. No. 4,303,472 because of the vertical attitude of the support during the molding process, there is a gravitationally-induced difference of a few cm or tens of cm of the pressure at which the microfiber is supplied at the start and at the end of the molding process which has been found to give rise to a risk of differences in properties in the molded coalescing filter along its length. A single molding channel has been found in an embodiment of the invention to suffice, at its headstock end bearing 24 fits onto the body 30 and at its tailstock end is attached end cap 26 having a central bearing recess 28.

As seen in FIG. 3, a machine body has platforms 70, 72 that carry double-acting pneumatic cylinder and guide rod assemblies 51 for maintaining the mould half-boxes 50 in a horizontal attitude and moving them towards and away from the support 10. The nearer mould half box is removed in FIG. 3 to reveal a movable platform or V-plate 74 and an underlying guide and double-acting pneumatic cylinder mechanism for raising the tubular support 10 into alignment with the concave molding surfaces of the half-screens and with the torpedo. The movable platform 74 is configured to support a tubular support 10 and is movable by an actuator mechanism between a raised position coinciding with the moudling space and a supply/delivery position for receiving a tubular support 10 in which the layer is to be molded and for deliver from the moulding space of a tubular support having a molded layer. As shown in FIG. 3, the molding torpedo and tailstock 76 are both refracted from the molding space, the tailstock also being axially movable as shown by arrows. The cylinder and guide rod half-box assemblies 51 include movable support assemblies 53 which carry the mould half boxes 50 which can be releaseably fastened in position by means of rotatable clips 55.

In FIG. 4, the torpedo is extended fully into the tubular support 10 with its body 30 extending substantially the full length of the tubular support and its end cap 28 registering with the tailstock end of the tubular support. Bearing 24 and O-ring seal 25 register with headstock end walls 54 with which they form a seal, and disc 60 meets end walls 54 to limit advance of the torpedo. The bearing 24 has a diameter substantially equal to the external diameter of the tubular support 10 whose headstock end it meets and closes to prevent microfiber suspension and air or other gas delivered through the torpedo from escaping from the headstock end of the tubular support 10 during the molding process. The torpedo is carried on movable platform 90 and can be rotated by means of motor 84 and drive belt 86, the bearing 24 remaining stationary. Alternative drive transmission arrangements are possible for transmitting rotation from the motor to the torpedo, e.g. gear wheels, a cogged belt or a chain drive, or the torpedo could be rotated directly by an hydraulic or fluidic e.g. compressed air drive. A drive mechanism (not shown) is provided for moving the platform 90 and the components carried by it towards or away from the molding space. Such mechanism may be pneumatic, hydraulic or may be by means of a mechanical drive such as a motor and chain drive or gearing. Aqueous microfiber suspension can be fed to the torpedo via suspension supply line 80 and plenum chamber 82 and air or other gas can be supplied via line 88 also opening into plenum chamber 82. Tailstock 76 has also advanced so that end disc 78 whose diameter is substantially equal to the external diameter of the tubular support 10 meets and closes the tailstock end of the tubular support to prevent escape of microfiber suspension and air/gas supplied via the torpedo from the tailstock end of the tubular support. During molding the end disc 78 fits within the half-screens 12, 14 the tailstock 76 extending through the opening defined by semicircular recesses 60 in tailstock end plates 58 to which they seal. The blind face of disc 78 is provided with a boss that fits into bearing recess 28 of torpedo end cap 26 to provide a tailstock bearing for the torpedo. It will be appreciated that in an alternative embodiment a tailstock bearing could be formed by providing a boss on the torpedo end cap 26 and a bearing recess in the blind face of the tailstock end disc 78. In either embodiment, during molding, the torpedo is supported for rotation at both its headstock and tailstock ends, which reduces vibration and wear during molding and reduces irregularities during the molding process. A drive mechanism (not shown) is provided for moving the tailstock 76 and tailstock disc 78 carried by it towards or away from the molding space. Such mechanism may be pneumatic, hydraulic or may be by means of a mechanical drive such as a motor and chain drive or gearing.

After the torpedo assembly and the tailstock have met the tubular support 10 and as seen in FIGS. 4 and 5 the movable platform or V-plate 74 is lowered and the mold half-boxes 50 are closed about the tubular support 10 by cylinders 33 and slideable guides 53 so that the half-screens 12, 14 meet the external surface of the tubular support 10 and end seals to bearing 24 and tailstock 76 are formed at end walls 54, 58, longitudinal seals for the mold space also being formed by abutment between the faces 17 of the half-screens in the opposing mold half-boxes and if necessary by compression of longitudinal seals of rubber or other elastomeric material along upper and lower edges of one of the half-boxes. The torpedo assembly is then rotated at e.g. 50-150 rpm, conveniently about 60 rpm and fibrous slurry, e.g. an aqueous fiber dispersion is pumped to the torpedo through supply line 80 and plenum chamber 62 and discharged through the mouth of the channel 32 all along the annular molding space within the tubular support 10 to build up a fibrous layer within the tubular support 10 as the torpedo assembly is rotated. The slurry may additional comprise a binder resin in an amount effective, after molding said fiber and curing, to act as a binder for the layer. In an embodiment the fibers are borosilicate glass fibers dispersed at in water adjusted to pH 2.9-3.1 with added sulfuric acid and containing about 80 g/l Arcodur 950 L or other aqueous dispersible heat curable acrylic or other resin. Fibers are trapped by the half-screens 12, 14, and fiber-free fluid is withdrawn between the plates of supports 18, 20 into the mold half-boxes from which it is withdrawn via suction lines 62, 64. Effective sealing around and between the mold half-boxes under the pressure exerted by the cylinders that close the mold half-boxes about the tubular support 10 avoids significant escape of fiber dispersion during the molding operation. After the fiber layer has been formed within the tubular support 10, air can be passed from a compressed air source through lines 80, 88 and plenum chamber 82 to expel residual water and to reduce the water content of the microfibrous layer.

Removal of a tubular support 10 with a micro-fibrous filtration layer formed within it is the reverse of the operations previously described. The mold half-boxes 50 are opened, the support plate 74 is raised, the torpedo and tailstock are withdrawn and the tubular support 10 is removed for drying and curing. In an embodiment the molded filter tube is then heated in embodiments at about 180-200° C. or even above e.g. at 200° C. for e.g. about 90 minutes to drive off residual water and cure the resin. The resulting filter tube may in an embodiment be formed into a finished coalescing filter which exhibits low oil-wetted pressure drop and low cold start pressure drop together with low oil carryover when challenged with an oil aerosol e.g. from a compressor or vacuum pump.

Figure 7:
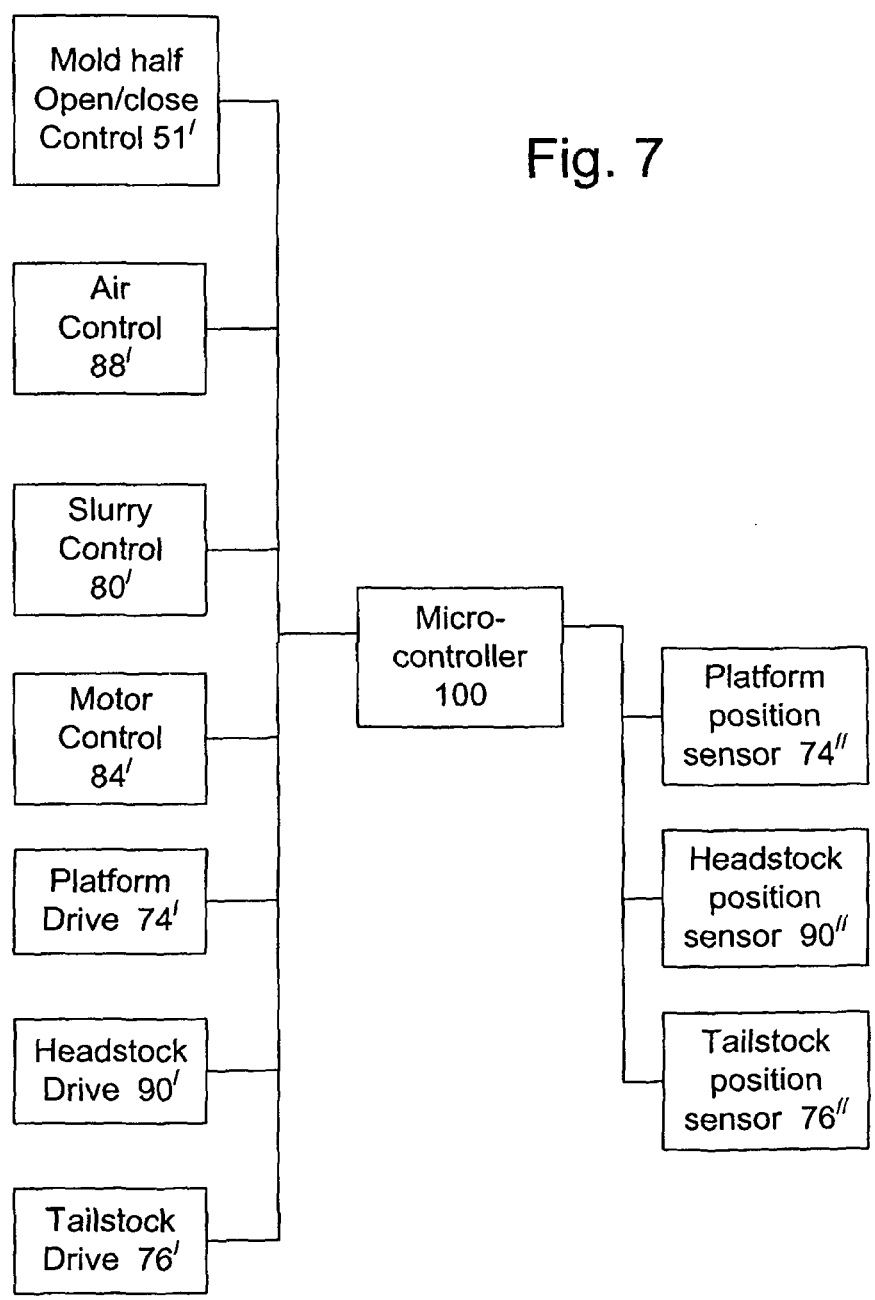
FIG. 7 is a simplified block diagram illustrating aspects of a control system.
Figure 8:
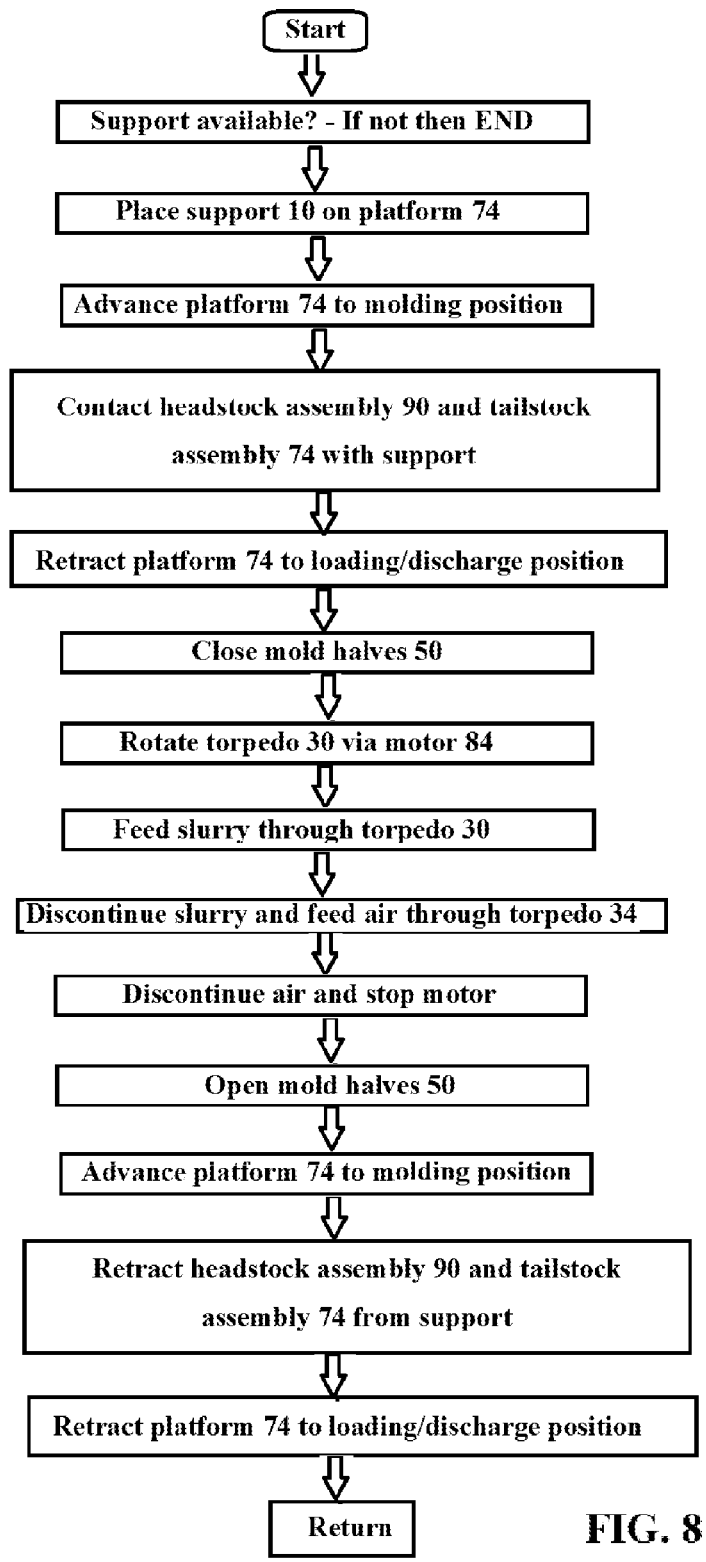
FIG. 8 is a simplified flowchart showing steps of a molding process.

In embodiments the above apparatus is controlled automatically by a computer system e.g. based on microcontroller 100 (FIG. 7). The microcontroller interfaces with:

a mold half open/close control 51;

air control 88' which may include a valve and an associated control circuit for initiating and shutting off supply of air to the molding torpedo;

slurry control 80 which may include a valve and associated control circuit for initiating and shutting off supply of slurry to the torpedo;

a motor control 84' for initiating, maintaining and discontinuing rotation of the torpedo;

a platform drive 74' which in embodiments may include a pneumatic cylinder, a position sensor 74" and associated control circuitry for moving the platform 74 between a position coinciding with the molding position and a retracted loading/discharge position;

a headstock drive 90' associated with platform 90 and components carried by it and with a headstock position sensor 90" for advancing and retracting platform 90; and a tailstock drive 76' associated with the tailstock and components carried by it and with a tailstock position sensor 76" for advancing and retracting the tailstock from the molding position. The sequence of operations that in an embodiment may be carried out under the control of microcontroller 100 is shown in simplified form in FIG. 8. It will be appreciated that instructions for carrying out the flowchart of FIG. 8 may be stored in memory in or associated with microcontroller 100. In the flowchart, molding is initiated by supply of a fresh support to platform 74. This may be a manual operation, but in practice will normally be an automatic feed of a fresh support to the platform 74 from a store or magazine from which supports can be dispensed one after another.

It will be appreciated that the foregoing description is non-limiting and that variants may be made without departing from the invention.

The invention claimed is:

1. A method for forming a fibrous layer within a foraminous tubular support, which comprises the steps of:

(a) providing the foraminous tubular support;
(b) providing forming mesh over the curved surface of the foraminous tubular support and closing its ends against escape of fluid; and
(c) introducing fibrous slurry from a pressurized source into an annular molding space between a rotary molding torpedo and an inner surface of the foraminous tubular support, the molding torpedo having at least one channel for slurry opening along a curved surface thereof, fibers in the slurry collecting within the forming mesh to form the layer.

2. The method of claim 1, wherein the foraminous tubular support is of foraminous metal.

3. The method of claim 1, wherein the foraminous tubular support is directed generally horizontally during the forming process.

4. The method of claim 1, wherein
a bearing member at a headstock end of the molding torpedo supports the molding torpedo for rotation and is configured to meet and close a headstock end face of the foraminous tubular support on insertion of the molding torpedo into the foraminous tubular support to reduce or prevent escape of slurry at the headstock end of the foraminous tubular support during molding; and
a tailstock moves a disc to meet a tailstock end of the foraminous tubular support, the disc being configured to close an end face of the foraminous tubular support to reduce or prevent escape of slurry form an end surface of the foraminous tubular support during molding.

5. The method of claim 4, wherein half-molds are releaseably closed about the foraminous tubular support to permit molding thereof, each half mold carrying forming mesh having a semi-cylindrical forming surface that meets the curved surface of the foraminous tubular support when the half-molds are closed; and
each half mold comprises support plates for the forming mesh, the support plates being radially directed and spaced longitudinally apart in a closely spaced array, spaces between the plates permitting liquid from the slurry to flow from the forming mesh.

6. The method of claim 5, wherein each half mold comprises a suction box within which the support plates and forming mesh are secured, suction lines leading from the suction box, and headstock and tailstock end plates of the suction box respectively sealing to the bearing member and to the tailstock in the when the half molds are closed about the foraminous tubular support.

7. The method of claim 1, wherein
(a) the molding torpedo is rotated at 50-150 rpm;
(b) when introduction of the slurry is completed, compressed air is introduced through the molding torpedo for removal of excess liquid and/or reducing the water content of the layer.

8. The method of claim 1, wherein said slurry is an aqueous slurry of glass fibers.

9. The method of claim 8, wherein the slurry is of borosilicate glass microfibers maintained at a pH of about 3.

10. The method of claim 1, wherein the slurry comprises additionally a binder resin in an amount effective, after molding said filter and curing, to act as binder for the layer.

11. The method of claim 10, wherein the binder resin is a water-dispersible thermally curable acrylic resin.

12. The method of claim 10, wherein said binder is the result of curing a resin comprising
(a) a polymer containing from 5 to 100% by weight of units derived from an ethylenically unsaturated acid anhydride or from an ethylenically unsaturated dicarboxylic acid whose carboxyl groups can form an anhydride group, and (b) a monomeric trihydric alcohol or an alkanolamine having at least two hydroxyl groups.

13. The method of claim 11, further comprising the steps of removing the foraminous tubular support from the molding space and heating the foraminous tubular support to dry the layer and cure the resin.

14. The method of claim 1, further comprising adding a drainage layer on the outside of the foraminous tubular support.

15. Apparatus for forming a fibrous layer within a foraminous tubular support, which comprises:

(a) a mould having a molding space for the tubular foraminous tubular support;

(b) forming mesh in the molding space for covering an exterior curved surface of the foraminous tubular support, the forming mesh being configured to collect fibers and permit liquid to pass through it;

(c) headstock and tailstock end closures for closing headstock and tailstock ends of the foraminous tubular support against escape of fluid;

(d) a rotary molding torpedo extendible into and retractable from the molding space for defining with an internal curved surface of the foraminous tubular support an annular space for formation of the fibrous layer, the molding torpedo having at least one channel for slurry opening along a curved surface thereof;

(e) a drive coupled to the molding torpedo for rotation thereof during molding;

(f) a supply line for supplying fibrous slurry from a pressurized source to the molding torpedo for flow into and through the molding space; and (g) suction lines for withdrawing fluid from the molding space.

16. The apparatus of claim 15, wherein the molding space is directed generally horizontally.

17. The apparatus of claim 16, wherein:

the headstock end closure comprises a bearing member at a headstock end of the molding torpedo configured to support the molding torpedo for rotation and to meet and close a headstock end face of the foraminous tubular support on insertion of the molding torpedo into the molding space to reduce or prevent escape of slurry at the headstock end of the foraminous tubular support during molding and a drive mechanism for advancing the molding torpedo and bearing member into the molding space and for retracting them from the molding space; and wherein the tailstock end closure comprises a tailstock member for meeting a tailstock end of the foraminous tubular support, the member being configured to close an end face of the foraminous tubular support to reduce or prevent escape of slurry form an end surface of the foraminous tubular support during molding, and a drive mechanism for advancing the tailstock member into the molding space to meet the foraminous tubular support and for retracting it from the molding space.

18. The apparatus of claim 17, comprising:

first and second half-molds which when in contact define the mold having the mold space, each half mold carrying forming mesh having a semi-cylindrical forming surface that together define a curved surface of the mold space when the half-molds are in contact; and a double acting pneumatic cylinder and guide rod assembly for advancing the first and second half molds into contact and for withdrawing them to open the mould space and for maintaining them in a horizontal attitude;

each half mold comprising support plates for the forming mesh, the support plates being radially directed and spaced longitudinally apart in a closely spaced array, spaces between the plates permitting liquid from the slurry to flow from the forming mesh; and each half mold comprising a suction box within which the support plates and forming mesh are secured, suction lines leading from the suction box and headstock and tailstock end plates for respectively sealing to the bearing member and to a tailstock that carries the tailstock disc the when the half molds are in contact to define the molding space.

19. The apparatus of claim 18, further comprising a compressed air line connected to the molding torpedo for introducing compressed air into the molding space.

20. The apparatus of claim 15, further comprising a movable platform configured to support the foraminous tubular support and movable by an actuator mechanism between a raised position coinciding with the molding space and a supply/delivery position for receiving the foraminous tubular support in which the layer is to be molded and for delivery from the mold space of the foraminous tubular support having a molded layer.

* * * * *